United States Patent

[11] 3,593,255

| [72] | Inventor | James E. White |
| | | Littleton, Colo. |
| [21] | Appl. No. | 838,364 |
| [22] | Filed | May 29, 1969 |
| [45] | Patented | July 13, 1971 |
| [73] | Assignee | Marathon Oil Company |
| | | Findlay, Ohio |

[54] ACOUSTIC LOGGING TOOL HAVING OPPOSED TRANSDUCERS
10 Claims, 4 Drawing Figs.

| [52] | U.S. Cl. | 340/15.5 SW |
| [51] | Int. Cl. | G01v 1/00, |
| | | G01v 1/04 |
| [50] | Field of Search | 181/0.5 |
| | MW, 0.5 H, 0.5 EM, 0.5 EC; 340/18, 15.5 SW |

[56] References Cited
UNITED STATES PATENTS

| 2,191,121 | 2/1940 | Slichter | 181/0.5 EM |
| 2,350,371 | 6/1944 | Smith | 181/0.5 EM |
| 3,354,983 | 11/1967 | Erickson et al. | 340/18 X |
| 3,417,371 | 12/1968 | Sterry | 340/18 |

Primary Examiner—Malcolm F. Hubler
Attorneys—Joseph C. Herring and Richard C. Wilson, Jr.

ABSTRACT: A logging tool having opposed paired transducers located on opposite sides of the borehole in both the source and the detector and methods for its use. One source transducer expands while the opposed transducer contracts and one detector transducer emits a positive electrical signal in response to inward pressure, while the other emits a negative electrical signal in response to inward pressure. The tool thus exploits flexural waves along a borehole and minimizes interference by the faster-traveling compressional waves.

PATENTED JUL 13 1971                3,593,255
SHEET 1 OF 2
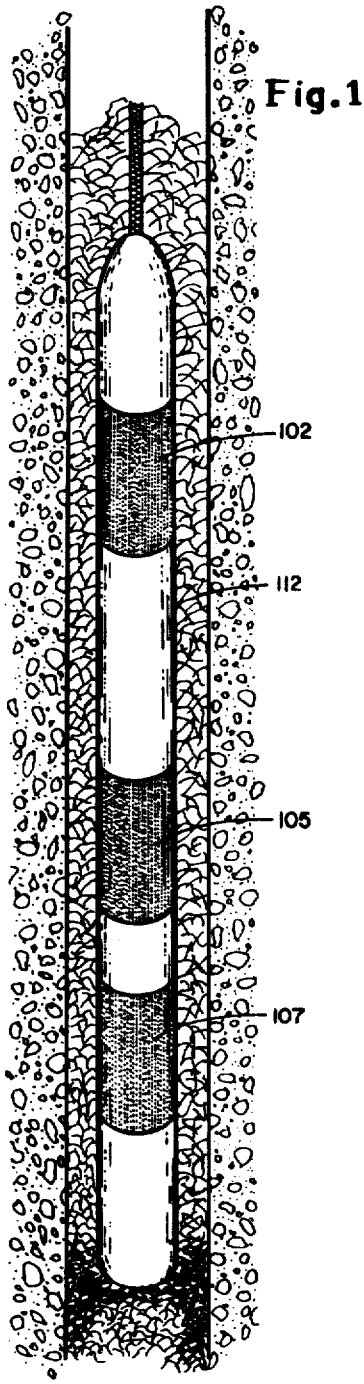
Fig.1
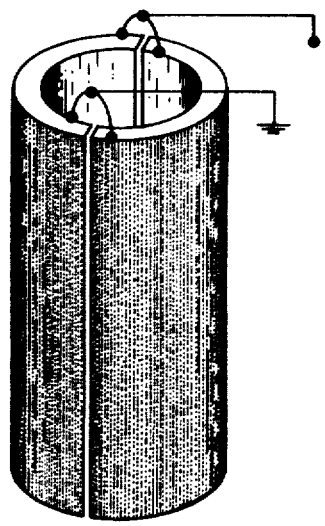
Fig.2
Fig.3A
Fig.3B
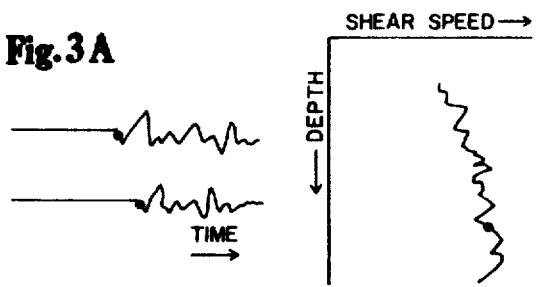
INVENTOR
J.E. WHITE
BY:
ATTORNEY

ACOUSTIC LOGGING TOOL HAVING OPPOSED TRANSDUCERS

CROSS REFERENCES TO RELATED APPLICATIONS

U.S. Pat. applications Ser. No. 761,264 filed Sept. 20, 1968 now abandoned and Ser. No. 777,988, filed Nov. 7,1968, now U.S. Pat. No. 3,475,722 both assigned to Marathon Oil Company, relate to the general field of the present invention.

BACKGROUND OF THE INVENTION

1. Field of the Invention

The present invention may be said to fall within the fields of Class 73, Measuring and Testing, (particularly subclasses 151 Borehole and Drilling Study, and 152, Formation Logging), and also within Class 181, Acoustics, (particularly subclass 015, Miscellaneous), all classes and subclasses being those of the Manual of Classification of the United States Patent Office.

2. Description of the Prior Art

Various methods of "seismic" or acoustical logging are taught by U.S. Pats. 2,207,281; 2,301,458; 2,233,992; 3,127,950; 3,180,141; 3,354,983; 3,363,719; and 3,376,950.

U.S. Pat. No. 3,354,983 uses a source coming in contact with the borehole wall which is exerting tangential forces in a horizontal direction, but does not use pairs of sources on opposite sides of the borehole.

U.S. Pat. No. 3,376,950 shows three or more wall-contact devices equally spaced around a hole but each device does the same thing with the objective of showing the dip of strata in the subterranean formation which the borehole traverses.

U.S. Pat. No. 3,363,719 utilizes transducers in contact with the wall of the hole and compares the speed around the borehole with the speed along the borehole.

These and other teachings will be evident from a study of the above patents, other patents in the aforementioned classes and in other subclasses, and also by a study of the nonpatent literature.

The prior art devices have suffered from a variety of deficiencies, particularly interference from compressional waves. In attempts to measure shear speed in rocks along oil wells, the faster-traveling compressional waves have often interfered with the shear waves. Because the compressional waves are often as high in amplitude as the shear waves, the effective signal-to-noise ratio for the measurement of shear waves has been very low in most instances.

SUMMARY

The acoustic logging tools of the present invention have paired transducer segments in the generator (source) and circumferentially aligned correspondingly paired transducer segments in the detector (receiver). That is, the generator has at least one pair of transducers located on opposite sides of the borehole and the detector has a pair of transducers located substantially directly above or beneath the pair of transducers of the generator. Further the transducers of each pair are electrically connected with opposite polarity so that a positive voltage causes one of the transducers of the generator pair to expand radially and the other to contract radially. Similarly, one of the transducers of the detector pair will emit a positive voltage in response to a force directed radially inward, while the other will emit a positive voltage in response to a force directed radially outward. Of course, there may be more than one pair of transducers in each of the detector and the generator. A particularly preferred configuration is two pairs of segmental transducers in each of the detector and the generator, each segmental transducer including approximately 90°.

This "shaker" source and receiver combination accentuates the shear wave and virtually eliminates the earlier waves, making it possible to measure the shear arrival time electronically and thus indicate shear speed automatically. Comparison of the amplitude of the shear wave at two spaced receivers permits measurement of shear attenuation. These two receivers may be located either at different elevations in the same borehole or in different spaced boreholes.

The ability of the present invention to measure the shear arrival time electronically is in marked contrast to the previous methods of measuring shear in which, for example, full wave forms have been photographed at various elevations within the borehole and the shear arrival times have been determined by visual examination and tedious manual processing. The exploitation of flexural waves along a borehole is, to the best of my knowledge, accomplished for the first time by the present invention and this mode of propagation is not excited by current acoustic logging tools.

BRIEF DESCRIPTION OF THE DRAWINGS

FIG. 1 is a schematic diagram of a tool of the present invention in place within a borehole.

FIG. 2 is a schematic representation of a single pair of transducers (two 180° segments) useful as generators and/or detectors for the present invention.

FIG. 3a is a schematic representation of the signals from two detectors which are spaced apart in the same borehole as shown in FIG. 1.

FIG. 3b is a diagrammatic plot of shear velocity versus depth for apparatus similar to that of FIG. 1 and signals similar to those of FIG. 3a.

DESCRIPTION OF THE PREFERRED EMBODIMENTS

The Logging Apparatus

Figure 4:
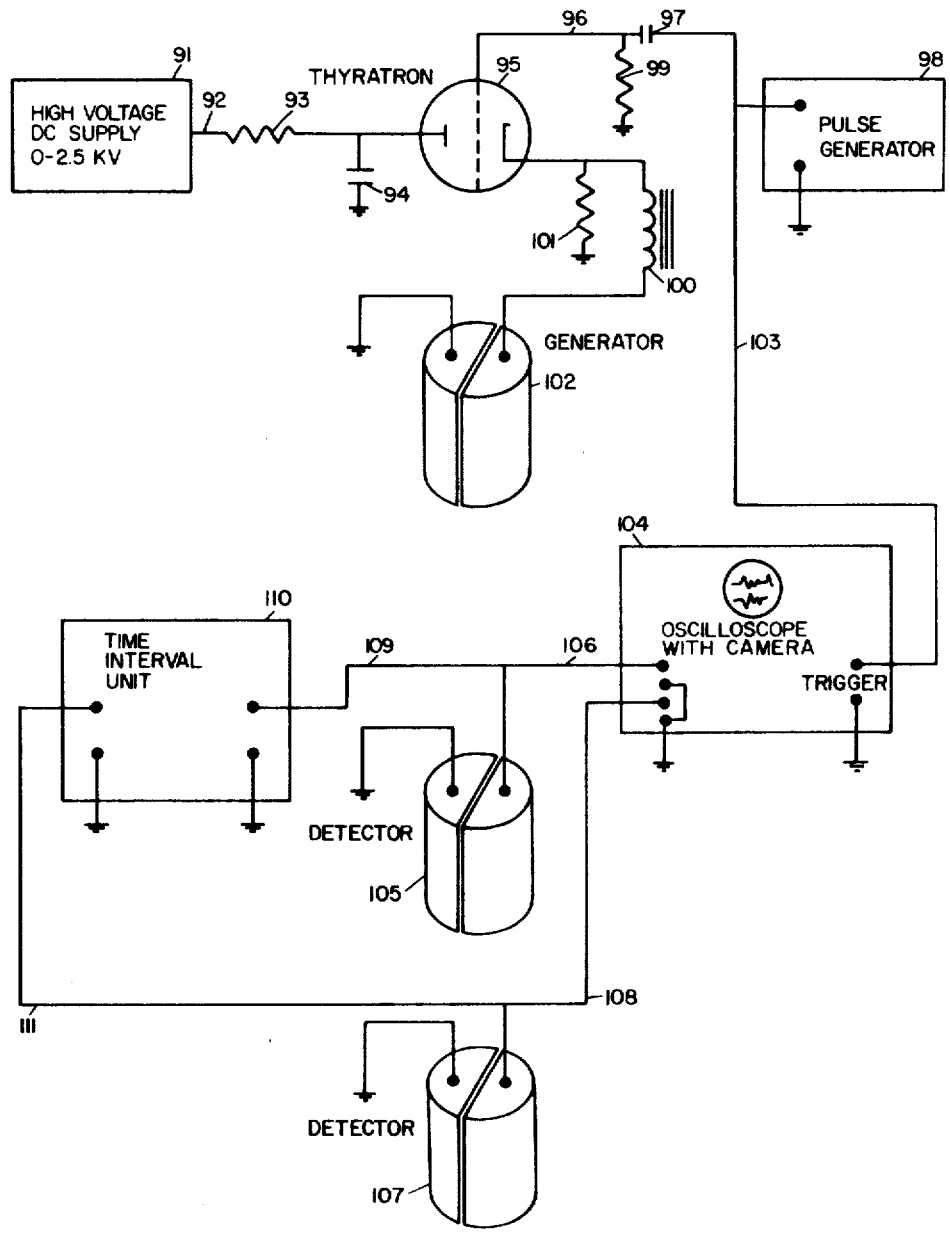
FIG. 4 is a block diagram of a preferred embodiment of the shaker acoustic logging tool of the present invention.

FIG. 1 shows a preferred embodiment of this invention showing a generator and two detectors mounted on a cylindrical tool containing electronic circuitry and suspended from a multiconductor cable.

FIG. 2 shows a preferred embodiment of the generator or the detector. In FIG. 2, two segments of barium titanate (obtainable from Gulton Industries, Inc. of Metuchen, New Jersey) are assembled so as to form a cylindrical body and connected electrically such that the application of a positive voltage between ground and the other terminal, causes one segment to expand radially and the other segment to contract, thus effectively moving the external surface of the generator in a direction perpendicular to the axis of the cylinder.

The assembly of FIG. 2 can serve also as a detector. Positive pressure (inwardly directed radial forces) acting on one segment will contribute a positive voltage between the output terminal and the ground, whereas negative pressure (outwardly directed radial forces) acting on the other segment will contribute a positive voltage. Hence the output of the detector depends upon the differences in the pressures experienced by the two segments.

FIG. 4 is a block diagram of a preferred embodiment of the shaker acoustic logging tool of the present invention. In FIG. 4, element 91 is a high-voltage DC power supply, preferably having an output of from about 0 to 2.5 kilovolts, e.g. the Kepco ABC 2500 M (0—2.5 kv.) manufactured by Kepco, Inc. 131—38 Sanford Avenue, Flushing New York, 11352. The high voltage power supply 91 is connected through shielded cable 92, and resistance 93, e.g. 150$k$ ohms, to capacitor 94, e.g. 0.005 microfarads to thyratron 95, e.g. thyratron type 6268 manufactured by Amprex Electronic Corporation, 230 Duffy Avenue, Hicksville, New York. The thyratron is preferably located downhole and is connected by shielded cable 96 to capacitor 97, e.g. 0.02 microfarads and to pulse generator 98, e.g. the model HP211B manufactured by Hewlitt-Packard of 1501 Page Mill Road, Palo Alto, California, 94304, used in conjunction with a voltage amplifier. Resistor 99 has an appropriate resistance, e.g. 33$K$ ohms so as to give a short time constant. Inductance 100, e.g. 100 millihenries and resistance 101, e.g. 6.8$k$ ohms are chosen so as to provide an oscillatory output when connected to the net capacitance of the generator 102 so as to impart to the fluid the desired impulsive force of short duration.

Lead 103 connects the pulse generator 98, generally located uphole, to the display device, e.g. oscilloscope 104. A suitable oscilloscope is the Tektronix 535, manufactured by Tektronix, Inc. of Beaverton, Oregon. The display device could instead be a high-speed digital readout device or other conventional display device. The oscilloscope or other display device will generally be located uphole. The oscilloscope will have a conventional sweep. A suitable camera may be employed with the oscilloscope such as the Tektronix C-19.

Detector 105 is connected to one input of oscilloscope 104 through shielded cable 106, and detector 107, spaced further from the generator, is connected to a second input of oscilloscope 104 through shielded cable 108. Detector 105 is connected through shielded cable 109 to one input of time interval unit 110, and detector 107 is connected through shielded cable 111 to the other output of time interval unit 110. The controls of the time interval unit (such as Time Interval Unit 5262A used with Electronic Counter 5245L, obtainable from Hewlitt-Packard Company, 395 Page Mill Road, Palo Alto, California) are set so as to start counting when the voltage from detector 105 first achieves some preset value, such as that indicated by a dot on the upper trace of FIG. 3a, and to stop counting time when the signal from detector 107 first achieves a similar preset value, indicated by a dot on the lower trace of FIG. 3a.

The Process of the Invention

Utilizing the apparatus shown in the figures and described above, a voltage (adjustable between 2 and 2.5 kv.) is applied by high voltage power supply 91 through cable 92 into the plate of thyratron 95. Pulse generator 98 applies a voltage pulse, e.g. 10 volts to the grid of the thyratron at an adjustable repetitive rate. On each application of the pulse from generator 98, condenser 94 discharges through thyratron 95 forming a pulse which is shaped by inductance element 100 and resistance element 101. This shaped pulse is applied to generator 102 with one polarity of the pulse being applied to transducer segment 102a and the opposite polarity being applied to transducer segment 102b located on the opposite side of the borehole from 102a. In response to the shaped pulse, transducer 102a expands while transducer 102b contracts. This action generates an acoustical wave in the mud within the borehole (shown as element 112 in FIG. 1). A flexural wave is thereby created in the formation surrounding the borehole and this flexural wave is transmitted downward along the borehole. The lateral motion in the hole caused by the generator 102 forms a flexural wave which travels downward along the borehole to the vicinity of detector 105 which consists of transducer segments 105a and 105b. The flexural signal simultaneously causes an inwardly directed radial pressure in transducer segment 105a and an outwardly directed radial pressure in transducer segment 105b. Transducer segments 105a and 105b are oppositely connected electrically so that the output of 105a is positive in response to inwardly directed pressure, while the output of 105b is positive in response to outwardly directed pressure. Therefore, the outputs from the two segments in response to the aforementioned flexural wave are additive. The additive signal emitted by the two segments of detector 105 travels along cable 106 to oscilloscope 104 where it is displayed. The same signal also travels along cable 109 to time interval unit 110 and opens an electronic gate within said time interval unit.

The flexural wave continues on down along the borehole until it arrives in the vicinity of detector 107 and thereby causes inward pressure upon transducer segment 107a and outward pressure upon transducer segment 107b. In response to these pressures, detector 107 also emits an additive electrical signal analogous to that emitted by detector 105. This signal travels along cable 108 and is also displayed on oscilloscope 104, preferably as a second trace. This same signal from detector 107 also travels along cable 111 to time interval unit 110 closing the electronic gating means. The interval between opening and closing of the gate is displayed.

In an alternate embodiment of the invention utilizing two detectors, 105 and 107, pulse generator 98 can simultaneously open a first and a second electronic gating means within time interval unit 110. The pulse from detector 105 can close said first electronic gating means. The pulse from detector 107 can close said second gating means. Oscilloscope 104 can then be utilized to display the time interval between the closing of the first electronic gating means and the closing of the second electronic gating means.

To screen out minor electrical outputs from stray forces acting on the detectors, the gates are preferably actuated only when the detector outputs reach preset threshold values.

Modifications of the Invention

It should be understood that the invention is capable of a wide variety of modifications and variations which will be made apparent to those skilled in the art by a reading of the specification and that the above described embodiments are merely illustrative. Recorders and other display devices may be substituted for the aforementioned oscilloscopes, various types of transducers and electrical circuitors can be substituted for those described above, and the time intervals and pulses may be displayed in whatever configurations are most convenient for the measurement of the speed of propagation.

I claim:

1. An acoustic logging tool for use in boreholes comprising in combination:
   a. generating means consisting of at least one pair of opposed segments of piezoelectric material, each of said segments being electrically driven so as to alternately expand and contract in a radial direction; the segments of each of said pairs being connected to electrical drive means so that when a first segment of said pair expands radially outward, the second segment of said pair contracts radially inward and when the first segment of said pair contracts radially, the second segment of said pair expands radially,
   b. electrical drive means for applying a voltage pulse to said segments,
   c. detector means spaced a distance from said generating means, comprising at least one pair of piezoelectric segments, each of said segments being located substantially in circumferential alignment with a corresponding segment of said generating means each of said detector segments being capable of generating a voltage in response to pressure acting on the face of that segment; the voltage generated by each of said segments of said pair being substantially identical when each of said segments is subjected to forces which are substantially identical in magnitude, said detector segments being electrically connected so that their combined electrical signals are equal to zero when both of said segments are both subjected to inwardly or outwardly directed forces of equal magnitude and so that the electrical outputs add when said detector segments of said pair are subjected to forces of equal magnitude which tend to move said segments in opposite radial directions,
   d. electrical measuring means for measuring the time interval between the first application of voltage to said generating means and the first signal emitted by said detector means and display means for displaying said time interval.

2. An acoustic logging tool having a shaker source and receiver combination which accentuates shear waves and virtually eliminates the faster-traveling compressional waves; said acoustic logging tool comprising:
   a. a source having at least one set of paired transducer segments located on opposite sides of the borehole, the transducer segments of said pair being oppositely electrically connected so that a positive electrical signal causes one generator transducer segment to expand and the other generator transducer segment of the pair to contract, b. a detector spaced a distance along said borehole from said generator, said detector having at least one set of corresponding paired transducer segments substantially circumferentially aligned with said generator transducer segments, the detector segments of each pair being oppositely electrically connected so that positive voltage is emitted from one detector segment in response to inward pressure and positive voltage is emitted from the other detector segment of said pair in response to outward pressure, c. display means for displaying the combined detector signal.

3. The tool of claim 1 wherein the generator and the detector each consist of two pairs of transducers.

4. The tool of claim 2 wherein the generator and the detector each consist of two pairs of transducers.

5. The tool of claim 1 wherein the transducers are barium titanate transducers.

6. The tool of claim 2 wherein the transducers are barium titanate transducers.

7. A method of acoustic logging utilizing flexual waves propagated along the borehole, said method comprising the steps of:

a. providing an acoustic energy signal at a first point in the wall of the borehole, by causing a transducer in contact with the borehole at said first point to expand, b. detecting at least a portion of said acoustic energy signal at a second point in the wall of said borehole, said second point being spaced away from said first point along said borehole and being substantially circumferentially aligned with said first point, c. simultaneously with the formation of said acoustic energy signal, causing a second transducer spaced substantially laterally at 180° from said first transducer to contract, d. thereafter reversing the applied voltage so that the first transducer contracts and the second transducer expands simultaneously and detecting at least a portion of the acoustic energy thus produced by means of a second detector transducer spaced substantially laterally and 180° from said first detector transducer in said borehole, e. displaying the combined electrical signal from said pair of detector transducers.

8. The process of claim 7 wherein said first and second transducers are alternately caused to expand and contract by the application of an oscillating current source.

9. An acoustic logging tool for use in boreholes comprising in combination:

a. a generating means consisting of at least one pair of opposed segments of piezoelectric material, each of said segments being electrically driven so as to alternatively expand and contract in a radial direction; the segments of each of said pairs being connected to electrical drive means so that when a first segment of said pairs expands radially, the second segment of said pair contracts radially and when the first segment of said pair contracts radially, the second segment of said pair expands radially, b. electrical drive means for applying a voltage pulse to said segments, c. a first detector spaced a distance from said generating means, comprising at least one pair of piezoelectric segments, each of said segments being located substantially in circumferential alignment with a corresponding segment of said detector, each of said detector segments being capable of generating a voltage in response to pressure acting on the face of that segment; the voltage generated by each of said segments of said pair being substantially identical when each of said segments is subjected to forces which are substantially identical in magnitude, said detector segments being electrically connected so that their combined electrical signals are equal to zero when both of said segments are subjected to inwardly or outwardly directed forces of equal magnitude and so that the electrical outputs add when said detector segments of said pair are subjected to forces of equal magnitude which tend to move said segments in opposite radial directions, d. a second detector spaced a distance from said generating means, comprising at least one pair of piezoelectric segments, each of said segments being located substantially in circumferential alignment with a corresponding segment of said detector, each of said detector segments generating a voltage in response to pressure acting on the face of that segment; the voltage generated by each of said segments of said pair being substantially identical when each of said segments is subjected to forces which are substantially identical in magnitude, said detector segments being electrically connected so that their combined electrical signals are equal to zero when both of said segments are subjected to inwardly or outwardly directed forces of equal magnitude and so that the electrical outputs add when said detector segments of said pair are subjected to forces of equal magnitude which tend to move said segments in opposite radial directions, e. first electrical gating means opened by the application of said pulse to said generating means and closed by the electrical output of said first detector reaching a preset value, f. second electrical gating means opened by the application of said pulse to said generating means and closed by the electrical output of said second detector reaching a preset value, g. display means for displaying the time interval between the closing of said first gating means and the closing of said second gating means.

10.

An acoustic logging tool for use in boreholes comprising in combination:

a. a generating means consisting of a least one pair of opposed segments of piezoelectric material, each of said segments being electrically driven so as to alternatively expand and contract in a radial direction; the segments of each of said pairs being connected to electrical drive means so that when a first segment of said pair expands radially, the second segment of said pair contracts radially and when the first segment of said pair contracts radially, the second segment of said pair expands radially, b. electrical drive means for applying a voltage pulse to said segments, c. a first detector spaced a distance from said generating means, comprising at least one pair of piezoelectric segments, each of said segments being located substantially in circumferential alignment with a corresponding segment of said detector, each of said detector segments being capable of generating a voltage in response to pressure acting on the face of that segment; the voltage generated by each of said segments of said pair being substantially identical when each of said segments is subjected to forces which are substantially identical in magnitude, said detector segments being electrically connected so that their combined electrical signals are equal to zero when both of said segments are subjected to inwardly or outwardly directed forces of equal magnitude and so that the electrical outputs add when said detector segments of said pair are subjected to forces of equal magnitude which tend to move said segments in opposite radial directions, d. a second detector spaced a distance from said generating means, comprising at least one pair of piezoelectric segments, each of said segments being located substantially in circumferential alignment with a corresponding segment of said detector, each of said detector segments generating a voltage in response to pressure acting on the face of that segment; the voltage generated by each of said segments of said pair being substantially identical when each of said segments is subjected to forces which are substantially identical in magnitude, said detector segments being electrically connected so that their combined electrical signals are equal to zero when both of said segments are subjected to inwardly or outwardly directed forces of equal magnitude and so that the electrical outputs add when said detector segments of said pair are subjected to forces of equal magnitude which tend to move said segments in opposite radial directions, e. electrical gating means opened by the electrical output of said first detector reaching a preset value, and closed by the electrical output of said second detector reaching a preset value, f. display means for displaying the time interval between the opening and the closing of said gating means.